US010518131B2

(12) United States Patent
Liu et al.

(10) Patent No.: US 10,518,131 B2
(45) Date of Patent: Dec. 31, 2019

(54) NORMALIZING SCORES OF ONE OR MORE PREDEFINED SEGMENTS TO ESTABLISH PACE COMPARISONS OF ACTORS THAT PARTICIPATE IN PHYSICAL ACTIVITIES ON THE PREDEFINED SEGMENTS

(71) Applicant: International Business Machines Corporation, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 15/397,957

(22) Filed: Jan. 4, 2017

(65) Prior Publication Data
US 2018/0185704 A1  Jul. 5, 2018

(51) Int. Cl.
*A63F 13/00* (2014.01)
*A63B 24/00* (2006.01)
*G01C 21/20* (2006.01)

(52) U.S. Cl.
CPC ...... *A63B 24/0062* (2013.01); *A63B 24/0021* (2013.01); *G01C 21/20* (2013.01); *A63B 2220/00* (2013.01)

(58) Field of Classification Search
None
See application file for complete search history.

(56) References Cited

U.S. PATENT DOCUMENTS

| 6,893,347 | B1* | 5/2005 | Zilliacus | A63F 13/12 463/41 |
| 9,517,416 | B1* | 12/2016 | Curtis | A63F 13/67 |
| 2005/0143154 | A1* | 6/2005 | Bush | A63F 13/12 463/4 |

(Continued)

OTHER PUBLICATIONS

Bryan, EveryMove Blog, "8 Fitness Apps That Use Your Friends (for motivation)," Dec. 21, 2012, pp. 6, Retrieved From, https://everymove.org/blog/8-fitness-apps-that-use-your-friends.

(Continued)

*Primary Examiner* — Paul A D'Agostino
(74) *Attorney, Agent, or Firm* — Zilka-Kotab, P.C.

(57) ABSTRACT

A computer-implemented method, according to one embodiment, includes calculating or receiving a normalized score for each segment of at least one route based on physical route conditions and environmental route conditions of the associated route, generating a pace comparison of multiple actors participating in a physical activity under different route conditions, and outputting the pace comparison. The pace comparison is based on the normalized scores of the segments of the route associated with each respective actor and a pace of each respective actor on the respective route. A computer program product for comparing paces of multiple actors, according to another embodiment, includes a computer readable storage medium having program instructions embodied therewith. The program instructions are readable and/or executable by a computer to cause the computer to perform the foregoing method.

20 Claims, 10 Drawing Sheets

(56) References Cited

U.S. PATENT DOCUMENTS

| | | | | |
|---|---|---|---|---|
| 2007/0233585 | A1* | 10/2007 | Ben Simon | G06Q 40/00 705/35 |
| 2007/0287596 | A1* | 12/2007 | Case, Jr. | A63B 24/00 482/8 |
| 2010/0004097 | A1* | 1/2010 | D'Eredita | G16H 50/20 482/8 |
| 2013/0131848 | A1* | 5/2013 | Arnone | G07F 17/3244 700/91 |
| 2014/0280219 | A1* | 9/2014 | Maser | G11B 27/031 707/748 |
| 2015/0049114 | A1 | 2/2015 | Geisner et al. | |

OTHER PUBLICATIONS

Duffy, PC Mag, "The 25 Best Fitness Apps of 2016," Jul. 8, 2016, pp. 47, Retrieved From, http://www.pcmag.com/article2/0,2817,2485287,00.asp.

Engle, Technology Tell, "Health and Fitness App Relies on Friendly Competition and Motivation," Nov. 21, 2014, pp. 4, Retrieved From, http://www.technologytell.com/apple/143290/health-fitness-app-relies-friendly-competition-motivation/.

Summers, TNW, "Flee From Zombies and Giant Boulders With the Race Yourself Fitness App for Google Glass," Jan. 8, 2014, pp. 7, Retrieved From http://thenextweb.com/apps/2014/01/08/flee-zombies-giant-boulders-race-fitness-app-google-glass/.

MapMyFitness, Sep. 20, 2016, pp. 1, Retrieved From http://www.mapmyfitness.com/.

MapMyRide, Sep. 14, 2016, pp. 1, Retrieved From http://www.mapmyride.com/.

iFit, Aug. 19, 2015, pp. 2, Retrieved From https://www.ifit.com/.

MapMyRun, Aug. 12, 2016, pp. 2, Retrieved From http://www.mapmyrun.com/.

RunSocial, "Run the World on Your Treadmill," May 13, 2016, pp. 2, Retrieved From https://www.runsocial.com/.

Anonymous, "Method and System for Providing Personal Training on Demand by Locating Trainers in Real Time," Prior Art Database Technical Disclosure, Oct. 20, 2014, pp. 1-3.

* cited by examiner

NORMALIZING SCORES OF ONE OR MORE PREDEFINED SEGMENTS TO ESTABLISH PACE COMPARISONS OF ACTORS THAT PARTICIPATE IN PHYSICAL ACTIVITIES ON THE PREDEFINED SEGMENTS

BACKGROUND

The present invention relates to comparing the performances of multiple actors participating in physical activities along one or more routes, and more specifically, this invention relates to normalizing aspects of predefined segments along such routes to compare the performances of the multiple actors.

SUMMARY

A computer-implemented method, according to one embodiment, includes calculating or receiving a normalized score for each segment of at least one route based on physical route conditions and environmental route conditions of the associated route, generating a pace comparison of multiple actors participating in a physical activity under different route conditions, and outputting the pace comparison. The pace comparison is based on the normalized scores of the segments of the route associated with each respective actor and a pace of each respective actor on the respective route.

A computer program product for comparing paces of multiple actors, according to another embodiment, includes a computer readable storage medium having program instructions embodied therewith. The program instructions are readable and/or executable by a computer to cause the computer to perform the foregoing method.

A computer-implemented method, according to yet another embodiment, includes calculating or receiving a normalized score for each segment of a route based on physical route conditions and environmental route conditions of the associated route, calculating or receiving an actual pace of an actor participating in a physical activity on the route, generating a normalized pace of the actor participating in the physical activity on the route based on the actual pace and the normalized scores of the route, and outputting the normalized pace.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for normalizing aspects of predefined segments along routes to compare the performances of the multiple actors traveling on the same route or on different routes.

In one general embodiment, a computer-implemented method includes calculating or receiving a normalized score for each segment of at least one route based on physical route conditions and environmental route conditions of the associated route, generating a pace comparison of multiple actors participating in a physical activity under different route conditions, and outputting the pace comparison. The pace comparison is based on the normalized scores of the segments of the route associated with each respective actor and a pace of each respective actor on the respective route.

In another general embodiment, a computer program product for comparing paces of multiple actors includes a computer readable storage medium having program instructions embodied therewith. The program instructions are readable and/or executable by a computer to cause the computer to perform the foregoing method.

In another general embodiment, a computer-implemented method includes calculating or receiving a normalized score for each segment of a route based on physical route conditions and environmental route conditions of the associated route, calculating or receiving an actual pace of an actor participating in a physical activity on the route, generating a normalized pace of the actor participating in the physical activity on the route based on the actual pace and the normalized scores of the route, and outputting the normalized pace.

Figure 1:
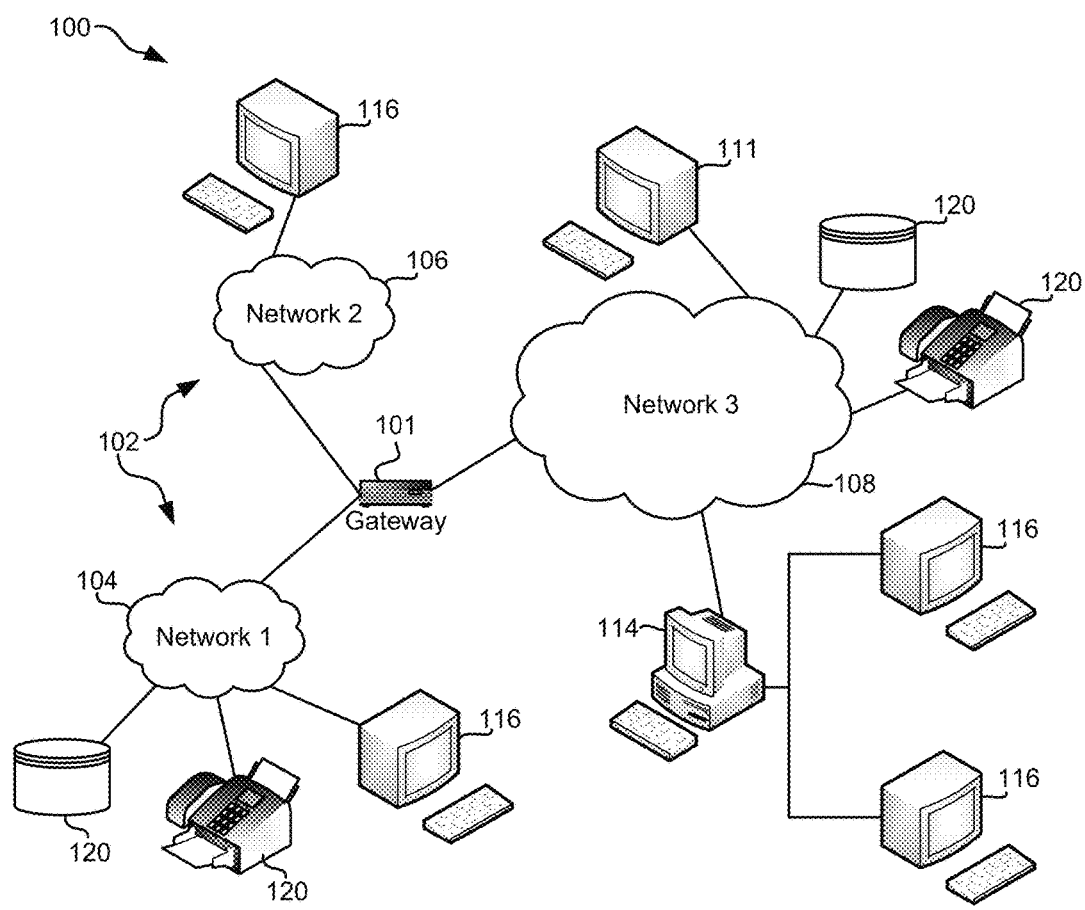
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a mobile telephone, smart watch, desktop computer, lap-top computer, hand-held computer, or any other type of processing logic, any of which may be considered as a "computer" for purposes of the present description. It should be noted that a user device 111 may also be directly linked to any of the networks, in various embodiments, e.g., via a wireless connection such as a telephone network, Wi-Fi connection, etc.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
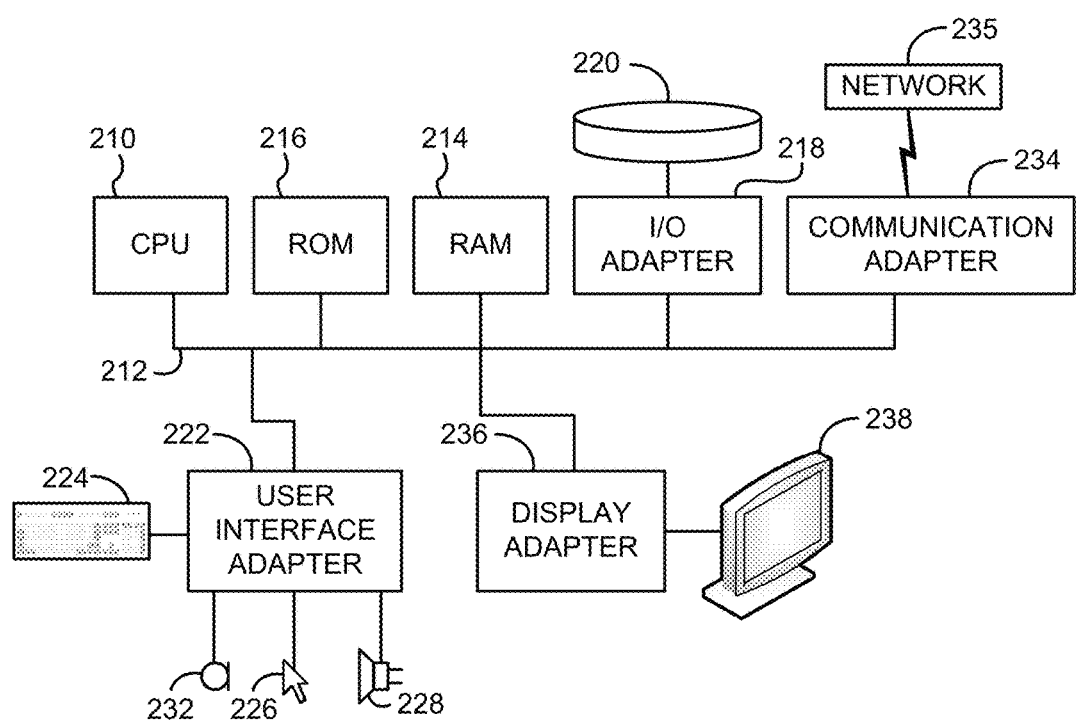
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Conventional hardware environments may include interactive applications that link a plurality of users together. Such hardware environments may link a plurality of users, for example, that use the hardware environment for fitness purposes. Such multi-user hardware environments however often do not provide realistic comparisons between the physical environments, e.g., such as environmental conditions, that the plurality of users are in. Furthermore, the impact that the different physical environments have on users with respect to one another is also not provided.

For example, assume that Bob wants to run a marathon "together" with Peter, however Bob is in Austin, running at the Town Lake, and Peter is in Uptown New York City. Bob runs the marathon in Austin for a time of 3:45 and Peter runs the marathon in New York for a time of 3:39; however, it is unknown who would have run the marathon faster had both Bob and Peter ran the marathon at the same time on the same route. Because such different routes are also likely to include differing conditions, it becomes even more difficult to accurately discern whether Bob or Peter would have been leading the race at any particular mile of the 26.2188 mile marathon.

Such issues are not limited to only performing time comparisons during and/or after running a foot race. For example, the same issues exist between a plurality of people and/or animals that participate in physical activities, e.g., driving, swimming, biking, kayaking, skating, etc., at different physical locations.

A comparison that illustrates routes of two actors, e.g., runners Bob and Peter of the example above, is shown in comparison 300 of FIG. 3 for purposes of an illustrative example, and will now be described.

Figure 3:
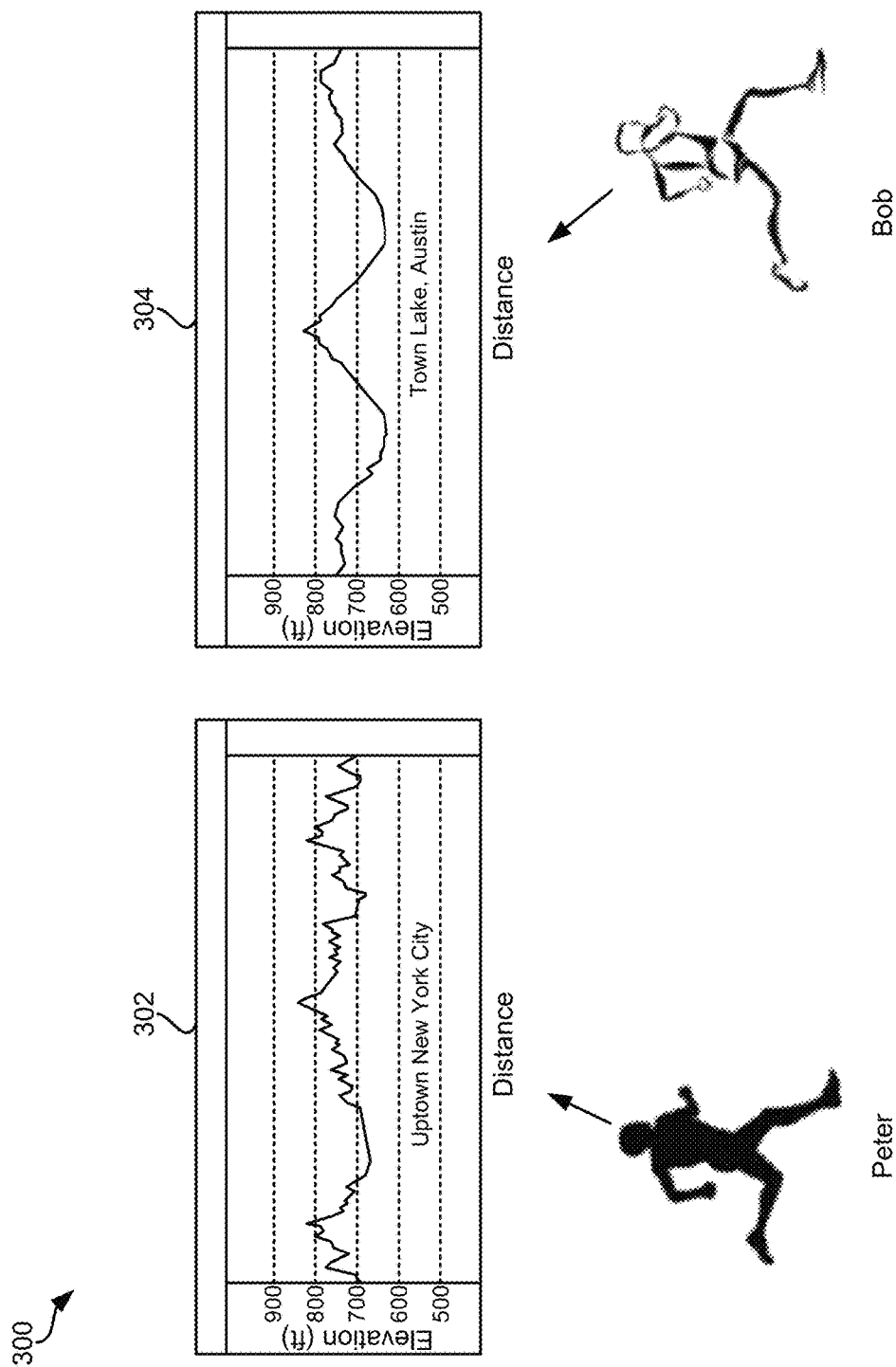
FIG. 3 illustrates a comparative plotting illustrating the distance versus elevation of two different courses used by two different actors, in accordance with one embodiment.

FIG. 3 depicts a comparison 300, in accordance with one embodiment. As an option, the present comparison 300 may be implemented in conjunction with features from any other embodiment listed herein, such as those described with reference to the other FIGS. Of course, however, such comparison 300 and others presented herein may be used in various applications and/or in permutations which may or may not be specifically described in the illustrative embodiments listed herein. Further, the comparison 300 presented herein may be used in any desired environment.

Comparison 300 includes a first plot 302 of the route that Peter ran in Uptown New York City. Comparison 300 also includes a second plot 304 of the route that Bob ran in Town Lake, Austin. The x-axis of the plots 302, 304 may illustrate a distance of the route that Bob and Peter each ran, where in the present example the distance of each route is a 26.2188 mile marathon. The y-axis of the plots 302, 304 may illustrate elevation (in feet) of points along the routes that the actors Bob and Peter each run.

When comparing the plots 302, 304, it may be observed that the route of the first plot 302 includes frequent elevation changes when compared the route of the second plot 304, which includes relatively fewer elevation changes. Moreover, the route of the first plot 302 may be observed to include relatively steeper elevation changes when compared to the route of the second plot 304, which may be observed to include more gradual elevation changes. The two runners of the present example may find it difficult to train together and/or compare their marathon performances with one another in response to at least these differences between the routes.

Various embodiments described herein include establishing normalizing scores of one or more predefined segments of one or more routes to establish detailed pace comparisons of the actors that perform physical activities along the predefined segments.

A method for generating normalizing scores for one or more predefined segments of a route, so as to establish pace comparisons for multiple actors participating in physical activities under different route conditions on the route, will be described below, e.g., see method 400. It should be noted that according to various embodiments, the multiple actors participating in a physical activity under different route conditions may include humans and/or possibly animals. In one approach, the multiple actors may be of the same type, e.g., all humans, or all animals. According to another approach, the multiple actors may include one or more humans and one or more animals.

Figure 4:
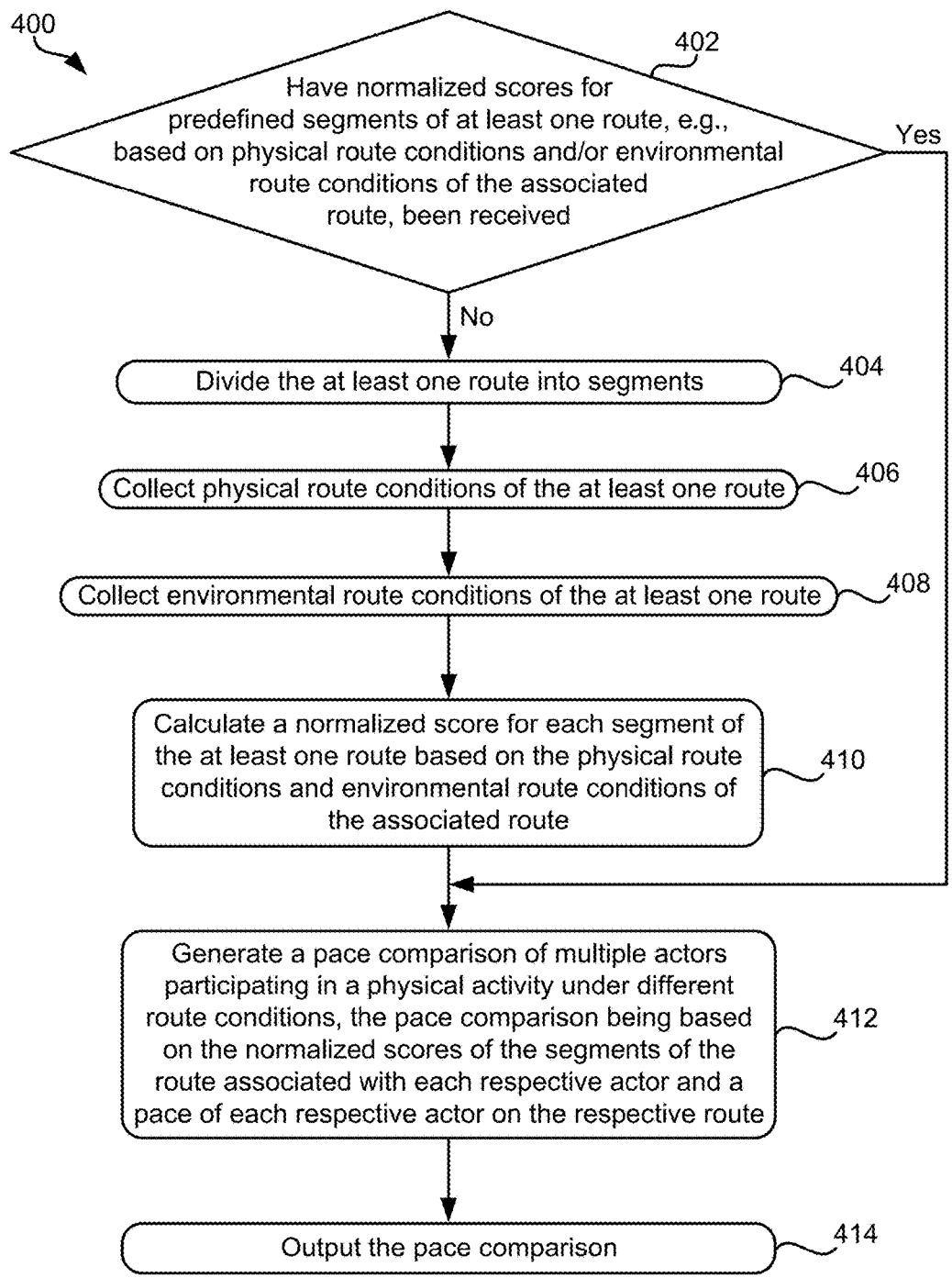
FIG. 4 illustrates a flowchart of a method, in accordance with one embodiment.

Now referring to FIG. 4, a flowchart of a method 400 is shown according to one embodiment. The method 400 may be performed in accordance with the present invention in any of the environments depicted in FIGS. 1-2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Decision 402 of method 400 includes determining whether a normalized score for predefined segments of at least one route have been received, e.g., received by a device and/or device component that is performing method 400. The normalization may, for example, be based on physical route conditions and/or environmental route conditions of the associated route.

When analyzing the relative difficulty and/or challenges that a particular route contains, dividing the route into segments may enable more precise analysis to be made than would otherwise be possible if the route were evaluated as a single undivided route, especially where the analysis inspects difficulties and/or challenges of the route. Accordingly, it is preferred to divide the route into segments.

The segments may or may not be known prior to performing method 400. Operation 402 may attempt to discern whether the segments are known, and if so, whether a normalized score for each segment is known. Referring to operation 402, a determination is made as to whether normalized scores for predefined segments of at least one route have been received. For example, the device performing the method may search a local or remote database for the information. In another approach, a query may be sent to a remote site requesting the segments and/or normalized scores, upon which the requested information is received.

In response to a normalized score for predefined segments of at least one route having been received (as illustrated by the 'Yes' logic path leading from decision 402), a pace comparison for the multiple actors may be generated, as will be described in detail elsewhere herein, e.g., see operation 412.

Where the segments are not known and/or the normalized score for each segment is unknown, the method 400 proceeds to operation 404. Particularly, in response to a normalized score for predefined segments of at least one route having not been received (as illustrated by the 'No' logic path leading from decision 402), the normalized score may be calculated.

To calculate a normalized score for segments of at least one route, the at least one route may be divided into segments, if not already segmented. See operation 404, which includes dividing the at least one route into segments. Dividing the route into segments may be performed in response to the segments not already being known.

The segment lengths may vary, depending on the embodiment. According to one approach, the segment lengths may each be the same length. According to another approach, one or more of the segment lengths may vary based on predefined parameters of any type, e.g., such as distance, elevational changes per unit distance, direction, locations of landmarks, locations of intersecting routes, according to a predefined segmentation for the particular route, etc.

Route conditions of the at least one route may additionally and/or alternatively be collected to calculate a normalized score for segments of at least one route, e.g., see operations 406-408.

Operation 406 of method 400 includes collecting physical route conditions of the at least one route. Physical route conditions of the at least one route may impact the performance of an actor that is participating in a physical activity under the one or more different physical route conditions. The collected physical route conditions of the at least one route may be used to determine how physically difficult performing a physical activity on one or more segments of a particular course are, relative to the physical difficulty that other physical route conditions of one or more segments of a different course include.

According to various embodiments, the physical route conditions may be selected from a group including: gradient; route ground surface material; e.g., dirt, decomposed granite, rubber track, pavement, etc.; traffic/congestion; etc. According to other embodiments, the physical route conditions may alternatively and/or additionally include a density of the physical route ground surface material. According to one approach, the density of the physical route may additionally and/or alternatively include an obstacle density of the route, e.g., other actors resisting the desired pace of the actor, physical objects resisting the desired route of the actor, unexpected safety concerns that impact the desired path of the actor, etc.

More than one physical route conditions may be collected from a database, topography maps, a mobile mapping system, etc., e.g., in response to the route including more than one physical route condition.

Operation 408 of method 400 includes collecting environmental route conditions of the at least one route. Environmental route conditions of the at least one route may impact the performance of an actor that is participating in a physical activity under the one or more different physical route conditions. For example, an actor's body, e.g., respiratory system, muscular system, endocrine system, etc. may be physically depleted at a faster rate when exposed to relatively harsher environmental route conditions while performing a physical activity on a course than it otherwise would when exposed to relatively less harsh environmental route conditions on another course.

According to various embodiments, the environmental route conditions may be selected from a group including: wind resistance, temperature, humidity, altitude, ultraviolet (UV) light index, and air pollution index. According to one approach, a temperature environmental route condition may include an air temperature along the at least one route. According to another approach, a temperature environmental route condition may include a temperature of the water, in response to all or a portion of the route navigating through water.

The environmental route conditions may additionally and/or alternatively include an angle of the sun relative to a vector corresponding to the direction that the runner is facing.

The route conditions gathered in operations 406 and/or 408 may be collected from any suitable source.

According to various embodiments, at least some of the route conditions gathered in operations 406 and/or 408 may be based at least in part on data from actors that have participated in a physical activity on at least one of the routes.

According to various embodiments, the physical route condition data and/or environmental route condition data collected in operations 406, 408 may be received and/or accessed from any location at which the condition data of the actors is stored. According to one approach, the route condition data may be collected from a cloud database to which data of wearable GPS-enabled devices and/or wearable sensors worn by the actors is output. For example, wearable GPS-enabled devices and/or wearable sensors may include, e.g., a mobile device, a chest strap body sensor, a smart-watch, etc. According to another approach, the route condition data may be collected from a received wireless transmission. According to yet another approach, the route condition data may be collected from data input manually by a user.

According to other embodiments, the physical route condition data and/or environmental route condition data collected in operations 406, 408 may additionally and/or alternatively be collected from and/or derived from sources other than devices used by actors on the routes, such as databases and/or websites. According to one approach, physical route condition data and/or environmental route condition data may be collected from an electronic map service provider and/or database. According to another approach, the physical route condition data and/or environmental route condition data may be collected from a website that records such conditions, e.g., a weather service website. According to yet another approach, the physical route condition data and/or environmental route condition data may be calculated using condition data collected from databases and/or websites. For example, the physical route condition data and/or environmental route condition data may be calculated by incorporating an actor's height with collected condition data, e.g., such as angle of sun reflection that shines in an actor's face.

According to other embodiments, data collected in one or more operations of method 400 may additionally and/or alternatively be selected for collection from a larger group of data using cloud sorting. According to one approach, the collected data may be publicly available data, e.g., available through crowd-sourcing platforms, from a website, etc. According to another approach, the collected data may be available through actor-generated collections such as forums where actors post performance data and/or route condition data of a physical activity that the actors have performed on a specified route.

Operation 410 of method 400 includes calculating a normalized score for each predefined segment of the at least one route based on the physical route conditions and environmental route conditions of the associated route, e.g., using the physical route conditions and environmental route conditions of the associated route collected in operations 404-408.

According to one embodiment, calculating the normalized score for each predefined segment of the at least one route based on physical route conditions and environmental route conditions of the associated route may include using curve fitting of a type known in the art. During the curve fitting, the normalized score may be adjusted some amount according to each condition that is incorporated into the normalized score. According to one approach, at least one of the data values used in the curve fitting are selected from a lookup table that includes data collected during method 400, e.g., see operations 406-408.

An illustrative example of how to calculate the normalized score using curve fitting will now be described. It should be noted that the current example of calculating the normalized score using curve fitting includes three steps, although according to other embodiments, the calculating the normalized score using curve fitting may include any number of steps. It should also be noted that the below example includes the physical activity running, although the physical activity may be any physical activity according to other examples. Accordingly, the actors in the below example are referred to as "runners".

Step one of the illustrative example which may be used to calculate the normalized score includes calculating, for each runner, the impact of each environmental route condition, e.g., temperature, humidity, UV light index, etc., on that runner. According to one approach, calculating the impact of each environmental route condition on a runner may include checking a runners running history for a particular route segment provided that the runner is running on the particular route segment at the same mileage into the route in each running performance. A measurement may be taken which measures how each environmental route condition affects the run time. For example, runner "A" may run 7 seconds/mile slower per degree Fahrenheit hotter environmental temperature.

According to one embodiment, this performance ratio may be used in an equation, such as: run time adjustment=7*degree Fahrenheit hotter environmental temperature.

Step two of the illustrative example which may be used to calculate the normalized score includes checking the run history available for all runners at all route locations available. With the run histories, a comparison may be made between running performances for the different runners at different routes but at the same mileage into the different routes in each running performance. For example, the comparisons may be made for different route segments that each exist between mile 2.5 and mile 3 of a 10 mile running route. In response to the environmental route conditions at the different routes being similar, a direct calculation may be made of the relative score between two route segments. For example, in response to a running performance on segment "X" of a route being 5% slower than a running performance on segment "Y" of another route, and the environmental route conditions at the different routes being similar, the relative score may be calculated.

In contrast, if the environmental route conditions are different, e.g., same runner running on segment X on a hot day but now running on segment Y on a cold day, an adjustment may be made to the runner's run time using the pre-determined equations of step 1.

Step three of the illustrative example that may be used to calculate the normalized score includes performing on every two segments, e.g., segments X and Y, one or more comparisons of different runners' running performances. The one or more comparisons may include taking an average of the running performances and calculating a normalized score. For example, assuming that three comparisons between different runners' performances on segment X as opposed to segment Y are: 5% slower, 4.5% slower, 4% slower, the average running performance on segment X may be calculated to be 4.5% slower.

Referring back to method 400, operation 412 includes generating a pace comparison of multiple actors participating in a physical activity under different route conditions. The pace comparison is output in operation 414.

The pace comparison may be based on the normalized scores of the segments of the route associated with each respective actor and a pace of each respective actor on the respective route. As noted by the logic paths entering operation 410, the generated pace comparison may be based on calculated normalized scores and/or received normalized scores.

According to one embodiment, such pace comparisons may be performed on a segment by segment basis. In such an embodiment, basing the pace comparisons on a segment by segment basis may establish any desirable number of comparisons for an actor that wants to review his/her performance at one or more specific locations of the route. For example, a swimmer may want to know how his/her first and fifth segment swimming performances of a swimming race compares to another swimmer's first and fifth segment swimming performances performed on a different route.

According to another embodiment, the pace comparison may be performed over the entire route. In such an embodiment, an actor may want to review his/her performance relative to one or more other actor's performances, on the route as a whole. For example, a cyclist may want to compare how his/her performance of cycling ten miles through a mountain range compares to another cyclist's ten mile ride on the flats in the mid-west of the United States.

The generated pace comparison may include a placing of the actors, where each of the actors of the pace comparison are sequentially placed in a chart in an order of the actors' performance rankings. According to one approach, the generated pace comparison may list the actors in an order of fastest to slowest performance, and/or vice versa. According to another approach, the generated pace comparison may list the actors in an order of most power exerted per segment and/or route as a whole, to least power exerted per segment and/or route as a whole, and/or vice versa. As described elsewhere herein, the generated pace comparisons may be performed on a segment by segment basis and/or on the route as a whole. Accordingly, any performance rankings of the generating pace comparisons may similarly order performances on a segment by segment basis and/or for the route as a whole.

The pace comparison may be based at least in part on data received from a mobile device. The mobile device may include a GPS component and/or wearable sensor component, as described elsewhere herein. Basing the pace comparison at least in part on data received from a mobile device may provide pace comparisons of current and recent physical performances of actors, e.g., in embodiments where the actors are using mobile devices while performing a physical activity. For example, an actor's actual time per segment may be received from a mobile device or other user device and used in conjunction with the normalized segment scores when generating the pace comparison.

According to various embodiments, data of the pace comparison need not be received at the same time that the multiple actors are performing, as the physical activities performed by the actors may occur at different times. For example, a runner may wish to compare his performance of running three miles through a mountain range in the winter with the performance of himself or a different runner who ran three miles in the desert in the summer. The different runs occurring at different times in the present example may challenge the runner in different ways, due to the physical route conditions and environmental route conditions of the associated routes likely being different from one another. By generating a pace comparison for the two runs which occurred at different times, the differing physical route conditions and environmental route conditions enables the two actors to discuss their relative performance and/or effectively train with each other while each actor is training at a different physical location.

Illustrative examples illustrating embodiments of one or more operations of method 400 will now be described below, e.g., see FIGS. 5-8.

Figure 5:
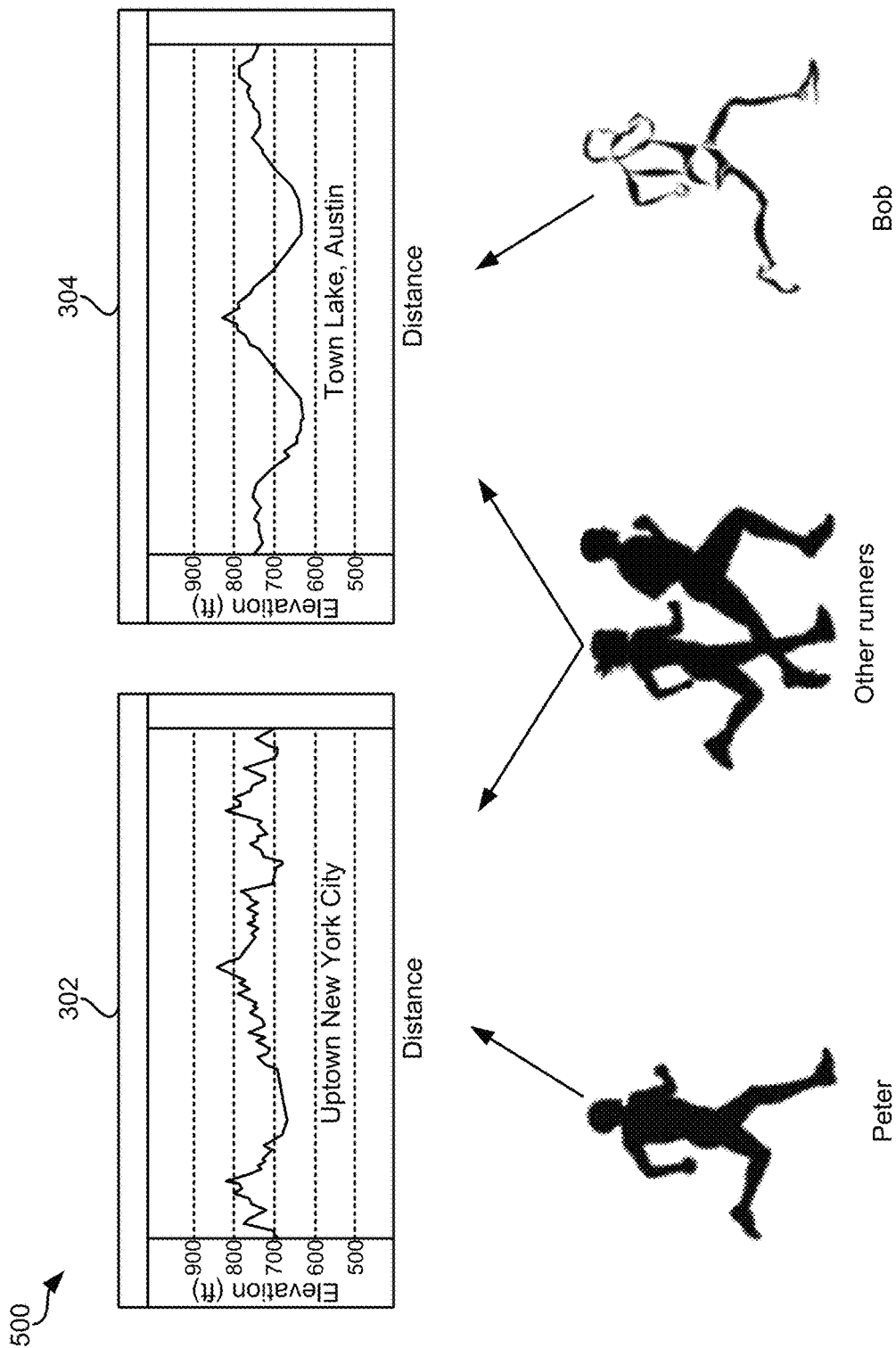
FIG. 5 illustrates a route condition plotting depicting the distance versus elevation of two different courses each used by a plurality of different actors, in accordance with one embodiment.
Figure 6:
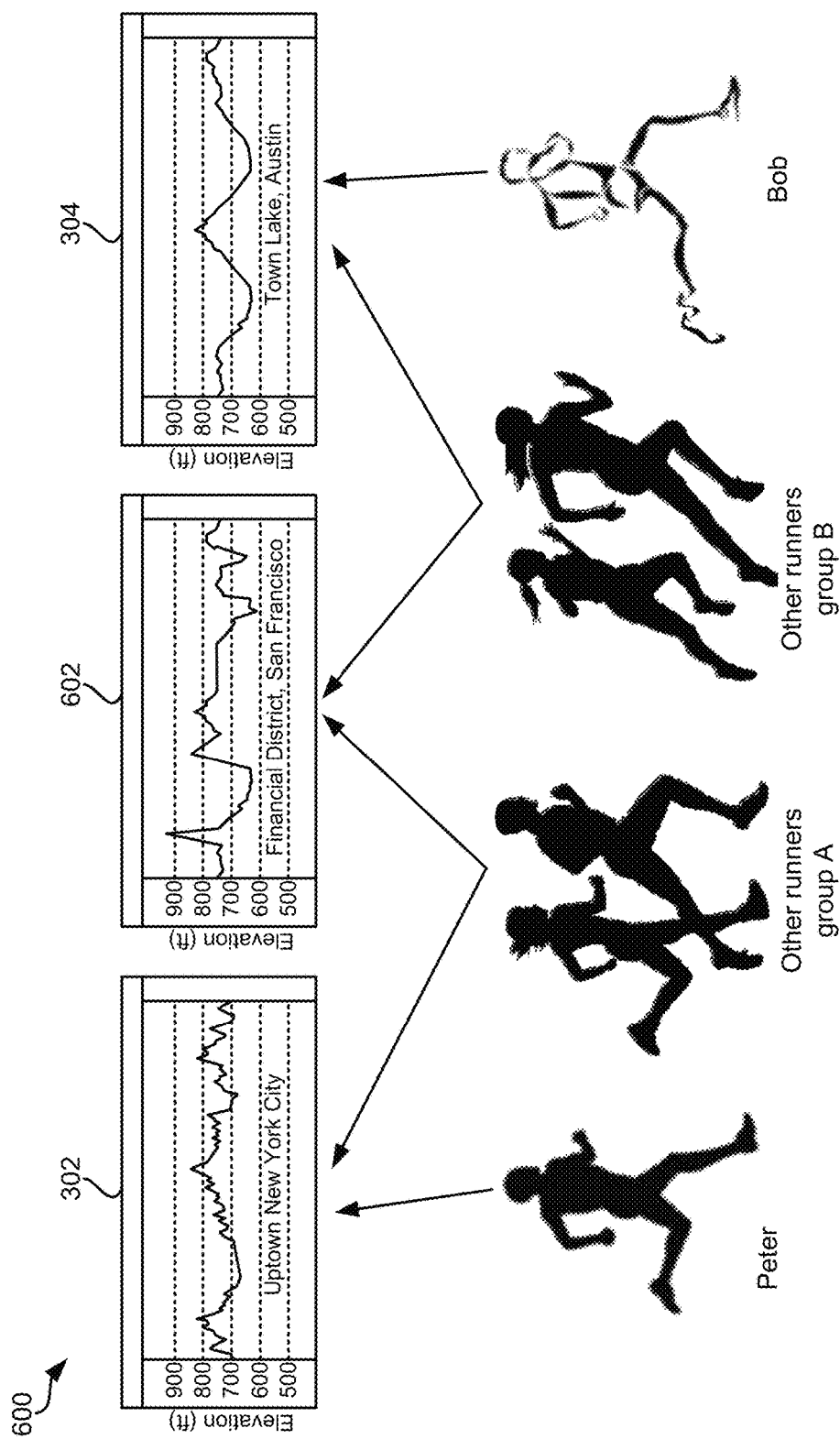
FIG. 6 illustrates a route condition plotting depicting the distance versus elevation of two different courses each used by a plurality of different actors, in accordance with one embodiment.

Referring now to FIGS. 5-6, embodiments in which collected data of two actors that have performed a physical activity on different physical routes, and other actors that have performed a physical activity on each of the different routes, are used to calculate a normalized score for each segment of at least one of the routes, will be described below.

FIGS. 5-6 depict route condition plots 500, 600 in accordance with various embodiments. As an option, the present route condition plots 500, 600 may be implemented in conjunction with features from any other embodiment listed herein, such as those described with reference to the other FIGS. Of course, however, such route condition plots 500, 600 and others presented herein may be used in various applications and/or in permutations which may or may not be specifically described in the illustrative embodiments listed herein. Further, the route condition plots 500, 600 presented herein may be used in any desired environment.

It should be noted that route condition plots 500, 600 include route conditions (distance and elevational change) for runners running on respective courses for purposes of providing an illustrative embodiment. However, the collection of route conditions may not be limited to selecting values from one or more route condition plots, e.g., as shown in the current illustrative examples. Rather, any type of route condition collection process may be used, several of which are described elsewhere herein. Moreover, it should be noted that other embodiments may include actors performing any type of physical activity, and therefore may not be limited to running, which is the physical activity performed by the actors of FIGS. 5-6.

Referring now to FIG. 5, there is provided an example of how normalized scores may be generated using data from other actors who have performed a physical activity on each of the routes for which a pace is being compared. The fact that the other actors have performed on each of the routes provides a degree of commonality that may enhance calculation of the normalized scores.

Turning to the example of FIG. 5, route condition plot 500 includes a distance versus elevation plot 302 of a route that Peter and other runners ran in Uptown New York City and a distance versus elevation plot 304 of a route that Bob and the other runners ran in Town Lake, Austin. As introduced in FIG. 3, in response to Peter having never run at Town Lake, Austin, and in response to Bob having never run at uptown New York City, the relative running performances of Peter and Bob may not be initially comparable, as the routes of Town Lake, Austin and uptown New York City may have different physical route conditions and/or different environmental route conditions. To generate a pace comparison between the relative physical performances of Peter and Bob, a normalized score for each segment of at least one routes that Bob and Peter run on may be calculated in part based on performance information of the other runners, who have run on the routes at both Town Lake, Austin and uptown New York City. The performance information of the other runners may include, e.g., physical route conditions, environmental route conditions, runner performance and/or pace data, etc., of the associated routes.

According to one embodiment, data of the other runners may be collected, e.g., as described in operations 406-408 of method 400. The other runners' performance information may be used, at least in part, to establish normalized score(s). The normalized score(s) based on the other runners' performances may be used to calculate the relative performances of Peter and Bob, e.g., in response to the normalized score(s) based on the other runner's performances providing a relative correlation between both routes, e.g., using a correlational matrix, using ratio relational mathematics, using a process that would be understood by one of skill in the art upon reading the present descriptions, etc.

According to another embodiment, one or more normalized scores of the other runners' performances at Town Lake, Austin and uptown New York City may be received, e.g., as described in decision 402 of method 400. The other runners' normalized scores may be used to establish the relative performances of Peter and Bob.

Data recorded by the runners, e.g., physical route condition data, environmental route condition data, runner performance time and/or pace, etc., while running along the routes at the two different locations may be collected and inputted when calculating a normalized score for segments of the routes. For example, physical route condition data including one or more varying elevation levels and/or average elevation levels of the routes that the actors Peter and Bob run may be collected from the route condition plot 500.

Referring now to FIG. 6, route condition plot 600 includes the first plot 302 of a route that Peter has run, and the second plot 304 of a route that Bob has run. Route condition plot 500 also includes a third plot 602 of a route that a first set of other runners (herein "other runners group A") and a second set of runners (herein "other runners group B") each ran at the Financial District of San Francisco. Additionally, the other runners group A have run on the route that corresponds to the first plot 302, and the other runners group B have run on the route that corresponds to the second plot 304.

Similar to the illustrative example of route condition plot 500 in FIG. 5, in response to Peter having never run at Town Lake, Austin, and in response to Bob having never run at uptown New York City, the relative running performances of Peter and Bob may not be initially comparable. However, the relative running performances of Peter and Bob may become comparable in response to using the data recorded by the runners of group A and B who have collectively run at all three of the routes, to create a comparison that correlates Peter's relative performance on the route in uptown New York City, to Bob's relative performance at Town Lake, Austin. Using known statistical techniques and the fact that runners of group A and B have all run in the Financial District of San Francisco, a parameter may be derived therefrom and applied to the analysis of the New York City and Austin routes when deriving normalized scores for the segments of the routes.

Again, operations 412 and 414 of FIG. 4 include generating and outputting the pace comparison. While such pace comparison may include any type of date, an illustrative generated pace comparison of multiple actors will now be described below, e.g., see FIG. 7.

Figure 7:
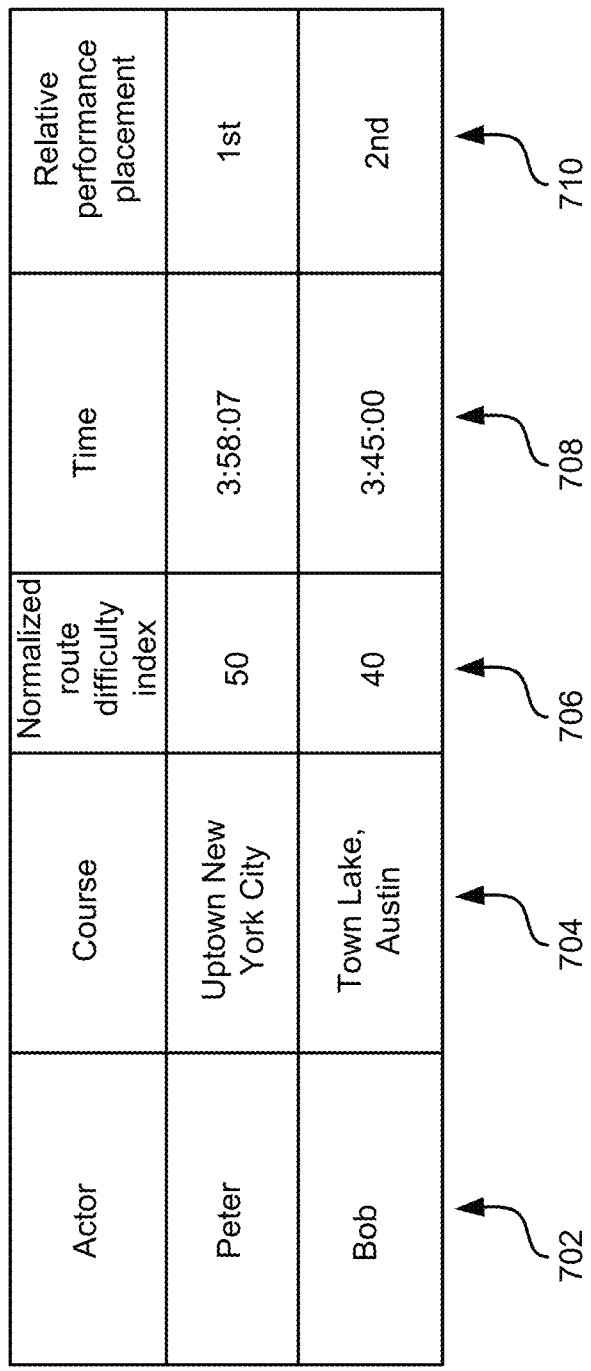
FIG. 7 is a chart of an illustrative generated pace comparison of multiple actors, in accordance with one embodiment.

FIG. 7 depicts a generated pace comparison 700, in accordance with one embodiment. As an option, the present generated pace comparison 700 may be implemented in conjunction with features from any other embodiment listed herein, such as those described with reference to the other FIGS. Of course, however, such generated pace comparison 700 and others presented herein may be used in various applications and/or in permutations which may or may not be specifically described in the illustrative embodiments listed herein. Further, the generated pace comparison 700 presented herein may be used in any desired environment.

The generated pace comparison 700 includes a plurality of columns, e.g., see columns 702-710, that illustrate the relative routes and relative performances of physical activities performed by a plurality of actors. The generated pace comparison 700 may include names of actors that performed physical activities, e.g., see column 702 includes actor names "Peter" and "Bob." The generated pace comparison 700 may additionally and/or alternatively include names of the routes that the physical activities of the actors were performed on, e.g., see column 704 includes route names "Uptown New York City" and "Town Lake, Austin." The generated pace comparison 700 may additionally and/or alternatively include normalized difficulty indexes for the routes that the physical activities of the actors were performed on, e.g., see column 706 includes a normalized difficulty index of 50 for Peter's route and a normalized difficulty index of 40 for Bob's route. The indices may be statistically derived from the normalized scores of the segments of the respective route.

The generated pace comparison 700 may additionally and/or alternatively include times that the actors took to complete physical activity on the respective routes, e.g., see column 708, illustrating that Peter completed his route in a time of 3:58:07 and Bob completed his route in a time of 3:45:00. The generated pace comparison 700 may additionally and/or alternatively include relative performance placements of the actors, e.g., that is based on their respective physical performances. For example, column 710 illustrates that Peter performed with a greater relative time than Bob did. Peter performing with a greater relative time than Bob did may mean that were Peter and Bob to have performed a physical activity on the same route at the same time, Peter would have completed the route faster than Bob. Determining the relative performances of more than one actor will be described in further detail elsewhere herein.

It should be noted that although the above example includes the two actors performing a physical activity at different times and at different locations, according to a different example, the physical activities performed by the actors may occur at different times at the same location, or by one single actor at different times and at different locations.

Referring again to method 400, operation 414 includes outputting the pace comparison. According to various embodiments, the generated pace comparison may be output to a storage device for future reference. According to one approach, the pace comparison may be wirelessly output to a cloud storage device. According to another approach, the pace comparison may be output to a device that is physically coupled to a device performing method 400. According to yet another approach, the pace comparison may be output from a circuit of a device performing method 400 to a memory component also of the same device.

According to another embodiment, the generated pace comparison may be output to one or more of the actors that participated in the physical activity type and contributed data associated with that performing of the physical activity to the generated pace comparison. For example, two training partners for a particular physical activity may each contribute performance data to each other's generated pace comparison. One or more of the generated pace comparisons may be output to such contributing actors to allow the actors to each remotely train with one another. Such remote training may be possible in response to the generated pace comparisons being output to such actors.

The output pace comparison may be referenced and/or collected in a subsequent performing of method 400, e.g., where data of the stored comparison is used during the collection(s) of operations 406, 408.

For purposes of an example, referring now to plot 800 of FIG. 8, an example of a route that is divided into multiple segments to establish a normalized score of actors performing physical activities on the route will now be described below.

Figure 8:
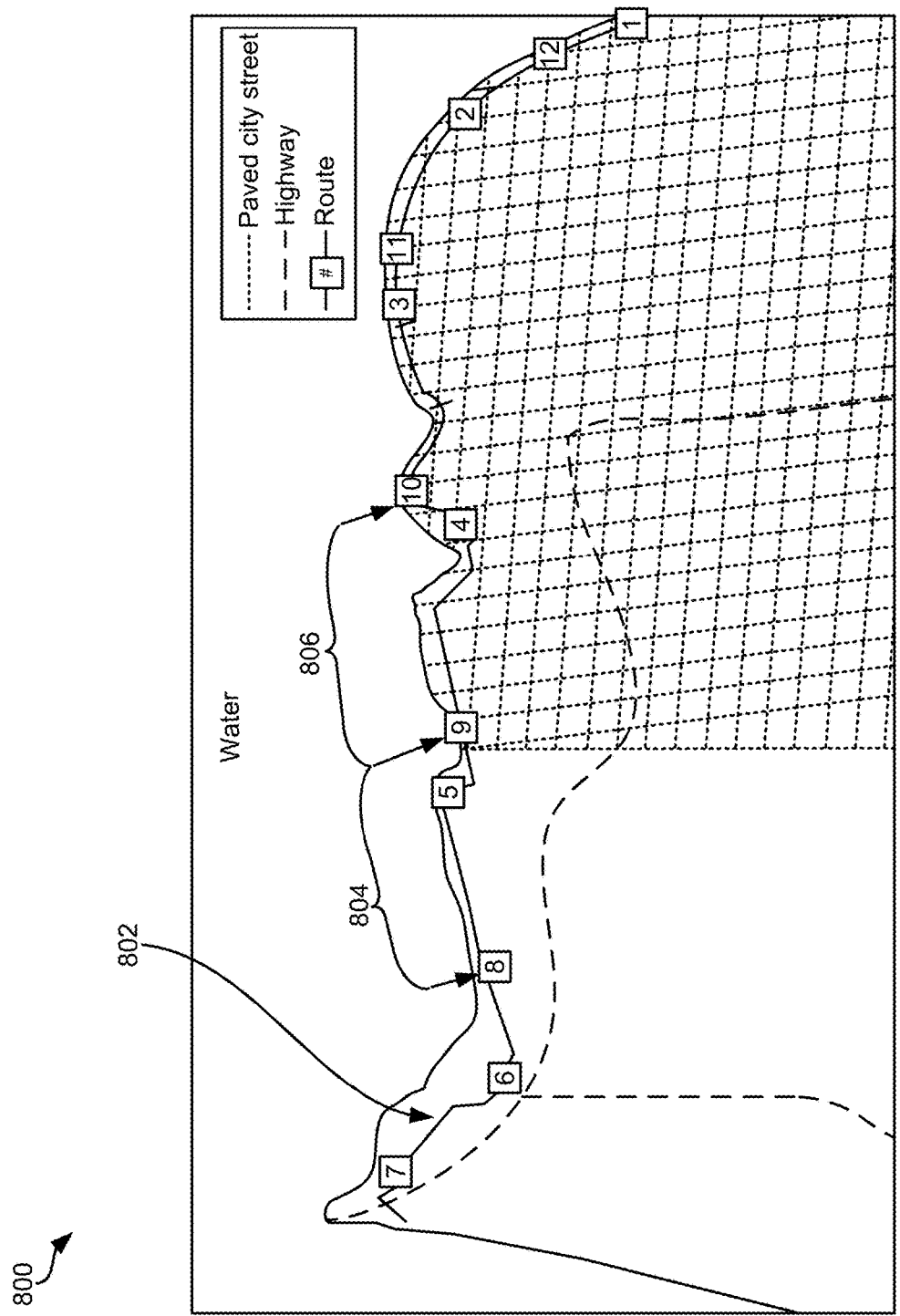
FIG. 8 is a depiction of an illustrative course route divided into multiple predefined segments, in accordance with one embodiment.

FIG. 8 depicts a plot 800, in accordance with one embodiment. As an option, the present plot 800 may be implemented in conjunction with features from any other embodiment listed herein, such as those described with reference to the other FIGS. Of route, however, such plot 800 and others presented herein may be used in various applications and/or in permutations which may or may not be specifically described in the illustrative embodiments listed herein. Further, the plot 800 presented herein may be used in any desired environment.

Plot 800 includes an illustrative route 802 that for purposes of an example, is located along a waterfront, e.g., see the water noted in plot 800. As described elsewhere herein, although the route 802 of the present example is located on land, according to further embodiments, routes may be located along a waterway, in the air, a combination of any of the afore mentioned route location types, etc.

Route waypoints may be located at any location along the route 802. In this example, the route 802 includes waypoints 1-12. One or more of the waypoints 1-12 may be located at known locations along the route 802. According to another approach, one or more of the waypoints 1-12 may be located at geographical landmarks along the route 802. Moreover, one or more of the waypoints 1-12 may be located at positions calculated by a computer, e.g., based on the actual route run, based on computer-generated mapping According to various embodiments, the waypoints 1-12 may be spaced any distance apart. According to one approach, the waypoints 1-12 may be spaced equidistantly apart. For example, in plot 800 of FIG. 8, consecutively numbered waypoints 1-12 along the route 802 are spaced 0.5 miles apart, thereby together marking every half mile of a six-mile-long route 802. Accordingly, each pair of adjacent consecutive waypoints a segment of route 802.

For purposes of an example, a first predefined segment 804 and a second predefined segment 806 define 0.5 mile segments of the route 802. The first predefined segment 804 defines a 0.5-mile segment that is located between waypoint 8 and waypoint 9, while the second predefined segment 806 defines a 0.5-mile segment that is located between waypoint 9 and waypoint 10. It may be assumed that a normalized score of 1.127 has been received or calculated for the first predefined segment 804. According to one approach, the normalized score of 1.127 for first predefined segment 804 may be calculated in response to using the collected physical route conditions and/or the collected environmental route conditions in a curve fitting model.

In addition and/or alternatively to assuming that a normalized score has been received for any predefined segment, a normalized scores for any predefined segment may be calculated using curve fitting as described elsewhere herein.

Similarly, for purposes of an example, it may be assumed that a normalized score of 1.635 has been received or calculated for the second predefined segment 806. According to one approach, the normalized score of 1.635 for the second predefined segment 806 may be calculated in response to using the collected physical route conditions and/or the collected environmental route conditions in a curve fitting model.

Using such normalized values, it may be determined that a particular runner running route 802 under the same environmental route conditions, may record a pace at the first predefined segment 804 that is 45% slower than the pace that the runner would record at the second predefined segment 806. Such a calculation may be made by subtracting the value of the ratio of the route segments 806, 804 (second predefined segment 806 normalized score/first predefined segment 804 normalized score) from the value of one, e.g., 1-1.635/1.127.

Assuming for purposes of an example that the above normalized values are determined by curve fitting only the physical route conditions of the route 802, an example of factoring the environmental route conditions of route 802 into the above normalized values will now be described below.

According to various embodiments, one or more environmental route conditions of a particular segment of route 802 may be incorporated into a determined normalized value (that was previously determined using only physical route conditions of a particular segment of the route 802) by adding a normalized difficulty value for each environmental route condition present on that route segment to the previously determined normalized value. The normalized difficulty value for each environmental route condition of a segment may be calculated by multiplying a recorded environmental route condition of a route segment by an environmental route condition index value. Accordingly, an incorporation of environmental route conditions into the normalized score of the first predefined segment 804 may be=1.127+recorded temperature*temperatureIndex+recorded humidity*humidityIndex+ . . . +recorded environmental route condition*environmental route condition index. The example we show here is a polynomial expression. Other possible equations can be calculated, such as algebraic expressions, and posynomial expressions.

The normalized score of the present example may be used to determine how much slower or faster a runner on the course might run one segment of the route 802 versus another segment of the route 802, while on the same run.

Such determinations may additionally and/or alternatively be used to determine how the runners of the route 802 might perform on other routes, such as a marathon in Boston. To determine how runners of route 802 might perform in a marathon in Boston, a comparison may be generated between one or more normalized scores of runner(s) of route 802 and one or more normalized scores of runner(s) of the Boston route, e.g., see correlating techniques introduced in FIGS. 5-6.

Such relationships may be used to evaluate an actor's performance on a particular route with any other route in the world, provided that condition data is available for segments of the route that the actor has not performed at.

To provide another example, assume that a normalized difficulty score has been established for each segment of routes in San Francisco and New York City. Assume Peter is running in downtown San Francisco and Bob is running in New York City. Also assume that Peter runs the first half mile of the San Francisco route in three minutes and five seconds and Bob run the first half mile of the New York City route in three minutes.

In response to receiving and/or collecting additional physical and/or environmental route conditions data, the actual running time of each runner, and using the known difficulty scores for the respective first half a mile of each of the routes, a pace comparison between the two runners' performances may be generated. Assuming that the calculated normalized scores show that the New York City segment is only 5% more difficult that the San Francisco segment, but Bob is only 4% slower than Peter in run time for his half mile route segment, it may be determined that Bob is running relatively faster than Peter. This is because although Peter is five seconds faster than Bob, Bob's 5% more difficult course makes Bob's relative running performance faster than Peter's running performance.

Figure 9:
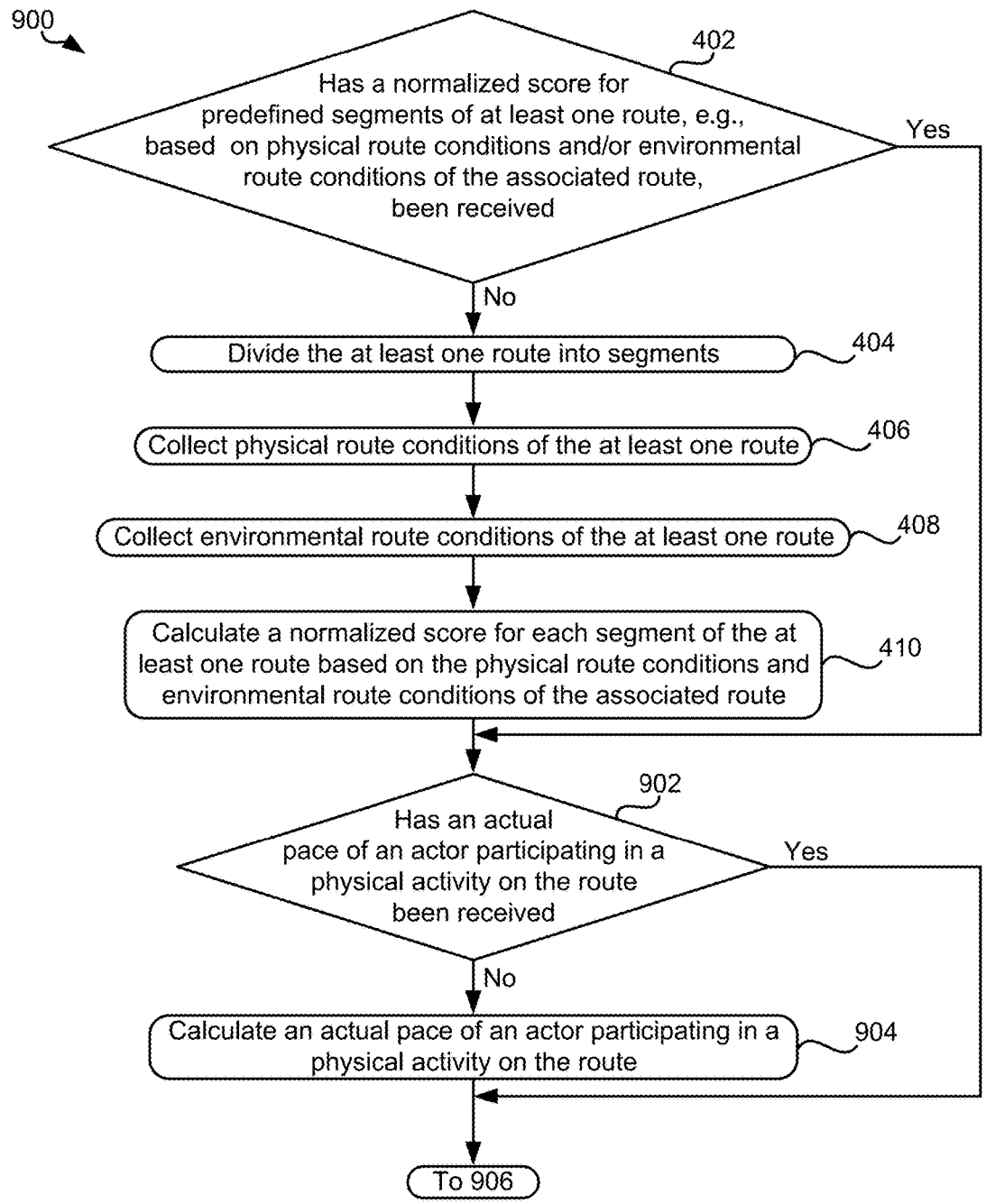
FIG. 9 is a flowchart of a method, in accordance with one embodiment.
Figure 9:
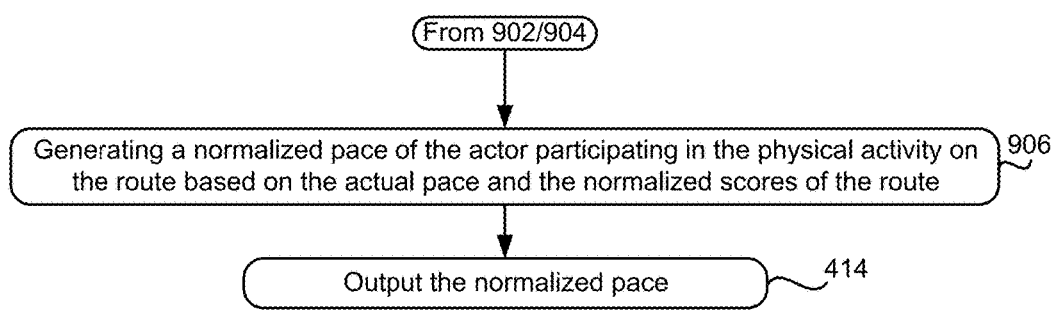

Referring now to FIG. 9, a method for generating a pace comparison of multiple actors using an actual pace of an actor participating in a physical activity on the route will now be described below.

Now referring to FIG. 9, a flowchart of a method 900 is shown according to one embodiment. The method 900 may be performed in accordance with the present invention in any of the environments depicted in FIGS. 1-2, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 900.

Illustrative processors include, but are not limited to, a central processing unit (CPU), an application specific integrated circuit (ASIC), a field programmable gate array (FPGA), etc., combinations thereof, or any other suitable computing device known in the art.

It should be noted that FIG. 9 illustrates a variation of the method of FIG. 4. Accordingly, various operations of FIG. 9 have common numbering with various operations of FIG. 4, and may be performed in a similar manner as the corresponding operations described above.

Decision 402 of method 900 includes determining if a normalized score for predefined segments of at least one route have been received.

Operation 404 of method 900 includes dividing the at least one route into segments, e.g., in response to determining in decision 402 that a normalized score for predefined segments of at least one route based on physical route conditions and environmental route conditions of the associated route have not been received.

Operation 406 of method 900 includes collecting physical route conditions of the at least one route.

Operation 408 of method 900 includes collecting environmental route conditions of the at least one route.

With continued reference to method 900, operation 410 includes calculating a normalized score for each predefined segment of at least one route based on the physical route conditions and environmental route conditions of the associated route, e.g., using the physical route conditions and environmental route conditions of the associated route collected in operations 404-408.

Actual pace data of an actor participating in a physical activity on the route may also be incorporated into method 900, e.g., see decision 902 and operations 904-906.

Decision 902 of method 900 includes determining if an actual pace of an actor participating in a physical activity on the route has been received. According to various embodiments, the actual pace of an actor participating in a physical activity on the route may be received from any source. According to one approach, the actual pace of an actor participating in a physical activity on the route may be received from a user input. According to another approach, the actual pace of an actor participating in a physical activity on the route may be received from a device, e.g., such as a mobile device, that outputs the actual pace of the actor in real time and/or after the performance on the route has been completed by the actor.

In response to determining that an actual pace of an actor participating in a physical activity on the route has not been received (as illustrated by the 'No' logic path leading from decision 902), an actual pace may be calculated, e.g., see operation 904.

Operation 904 of method 900 includes calculating an actual pace of an actor participating in a physical activity on the route. According to various embodiments, the actual pace of an actor participating in a physical activity on the route may be calculated using pace calculation methods that would be appreciated by one skilled in the art upon reading the present descriptions. According to one approach, the actual pace of an actor participating in a physical activity on the route may be calculated by using the distance formula, e.g., pace=distance/time. In such an approach, the actual pace may be calculated using performance data of the actor's performance on the route, e.g., time data, velocity data, distance data, etc. received from a GPS-enabled device carried by the actor.

In response to determining that an actual pace of an actor participating in a physical activity on the route has been received (as illustrated by the 'Yes' logic path leading from decision 902), a normalized pace of the actor may be generated, e.g., see operation 906.

Operation 906 of method 900 includes generating a normalized pace of the actor participating in the physical activity on the route based on the actual pace and the normalized scores of the route. The normalized pace may be generated using similar processes as may be used in generating the pace comparison described elsewhere herein, e.g., see operation 412.

Operation 414 of method 900 includes outputting the normalized pace. Again, similar to the generating the pace comparison of method 400, the generated normalized pace of method 900 may be output to a storage device for future reference.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
calculating or receiving a normalized score for each segment of at least one route based on physical route conditions and environmental route conditions of the associated route;
generating a pace comparison of multiple actors participating in a physical activity under different route conditions, the pace comparison being based on the normalized scores of the segments of the route associated with each respective actor and a pace of each respective actor on the respective route, wherein the pace comparison is generated while at least one actor of the multiple actors is participating in the physical activity on a respective route, wherein the pace of the at least one actor is received in real time of the participation in the physical activity on the respective route; and
outputting the pace comparison to the at least one actor during the participation in the physical activity on the respective route, for allowing the at least one actor to comparatively train with a different one of the multiple actors participating in the physical activity on a different route.

2. The computer-implemented method of claim 1, wherein the physical route conditions are selected from a group consisting of: gradient, route ground surface material, and traffic/congestion.

3. The computer-implemented method of claim 1, wherein the environmental route conditions are selected from a group consisting of: wind resistance, temperature, humidity, altitude, ultraviolet (UV) light index, and air pollution index.

4. The computer-implemented method of claim 1, wherein the physical activities performed by the actors occur at different times.

5. The computer-implemented method of claim 1, wherein the normalized scores are further based on data from actors that have participated in a physical activity on at least one of the routes.

6. The computer-implemented method of claim 1, wherein the pace comparison is based at least in part on data received from a mobile device.

7. The computer-implemented method of claim 1, comprising: deriving a normalized difficulty index for at least one of the routes, wherein the at least one normalized difficulty index is statistically derived from the normalized scores of the segments of the respective route, wherein all of the environmental route conditions are acquired from sources other than devices carried by the actors, wherein the pace comparison is a list, wherein the multiple actors are listed within the list in an order of most power exerted per segment to least power exerted per segment of the respective route, wherein the list includes the at least one normalized difficulty index, wherein each of the segments of at least one route are the same length.

8. A computer program product for comparing paces of multiple actors, the computer program product comprising a computer readable storage medium having program instructions embodied therewith, the program instructions readable and/or executable by a computer to cause the computer to:
calculate or receive, by the computer, a normalized score for each segment of at least one route based on physical route conditions and environmental route conditions of the associated route;
generate, by the computer, a pace comparison of multiple actors participating in a physical activity under different route conditions, the pace comparison being based on the normalized scores of the segments of the route associated with each respective actor and a pace of each respective actor on the respective route, wherein the pace comparison is generated while at least one actor of the multiple actors is participating in the physical activity on a respective route, wherein the pace of the at least one actor is received in real time of the participation in the physical activity on the respective route; and
output, by the computer, the pace comparison to the at least one actor during the participation in the physical activity on the respective route, for allowing the at least one actor to comparatively train with a different one of the multiple actors participating in the physical activity on a different route.

9. The computer program product of claim 8, wherein the physical route conditions are selected from a group consisting of: gradient, route ground surface material, and traffic/congestion.

10. The computer program product of claim 8, wherein the environmental route conditions are selected from a group consisting of: wind resistance, temperature, humidity, altitude, ultraviolet (UV) light index, and air pollution index.

11. The computer program product of claim 8, wherein the physical activities performed by the actors occur at different times.

12. The computer program product of claim 8, wherein the normalized scores are further based on data from actors that have participated in a physical activity on at least one of the routes.

13. The computer program product of claim 8, wherein the pace comparison is based at least in part on data received from a mobile device.

14. A computer-implemented method, comprising:
calculating or receiving a normalized score for each segment of a route based on physical route conditions and environmental route conditions of the associated route;
calculating or receiving an actual pace of an actor participating in a physical activity on the route;
generating a normalized pace of the actor participating in the physical activity on the route based on the actual pace and the normalized scores of the route, wherein the normalized pace of the actor is generated while the actor is participating in the physical activity on the route; and
outputting the normalized pace to the actor during the participation in the physical activity on the route.

15. The computer-implemented method of claim 14, wherein the physical route conditions are selected from a group consisting of: gradient, route ground surface material, and traffic/congestion.

16. The computer-implemented method of claim 14, wherein the environmental route conditions are selected from a group consisting of: wind resistance, temperature, humidity, altitude, UV index, and air pollution index.

17. The computer-implemented method of claim 14, comprising generating a pace comparison of multiple actors participating in physical activities under different route conditions, the pace comparison being based on normalized scores of the segments of the route associated with each respective actor and a pace of each respective actor on the respective route.

18. The computer-implemented method of claim 17, wherein the pace comparison is based at least in part on data received from a mobile device.

19. The computer-implemented method of claim 14, wherein the normalized scores are further based on data from actors that have participated in a physical activity on at least one of the routes, wherein the data is collected by wearable GPS-enabled devices and/or wearable sensors worn by the actors.

20. The computer-implemented method of claim 14, wherein all of the environmental route conditions are acquired from sources other than devices carried by the actors.

* * * * *